United States Patent Office.

HENRY K. SCHANCK, OF CHICAGO, ILLINOIS.

Letters Patent No. 74,606, dated February 18, 1868; antedated December 27, 1867.

IMPROVED COMPOSITION FOR ROOFING.

*The Schedule referred to in these Letters Patent and making part of the same.*

TO ALL WHOM IT MAY CONCERN:

Be it known that I, HENRY K. SCHANCK, of Chicago, in the county of Cook, and State of Illinois, have invented a new and useful Improvement in Composition for Roofing; and I do hereby declare and make known that the following is a full, clear, and exact description of the same, sufficient to enable those skilled in the art to manufacture and use it.

The composition is compounded of the following-named ingredients, to wit: Crude coal-tar or its equivalent, flour sulphur, plumbago, litharge, India rubber, and finely-pulverized clay, combined substantially in the following-described proportions and manner:

I take about five gallons crude coal-tar, about eight pounds sulphur, six pounds plumbago, three pounds litharge, and three pounds India rubber, and put the whole into a suitable vessel over a fire, heating and stirring the same until the mass is vulcanized. The compound is then poured into a kettle or vessel of thin galvanized iron or other suitable material, which kettle is set into a larger furnace-kettle, partly filled with water, so as to heat the said compound by steam, thereby avoiding all danger of scorching, crisping, or crusting the same. I then add sufficient finely-pulverized clay, (blue clay being preferred,) to form, by thoroughly mixing and working the same into the liquid compound aforesaid, a thick, stiff mastic or mortar, which is applied while hot upon the naked roof-boards, which should be narrow, to prevent warping, by means of a trowel or other suitable device, in the same manner that the common plasterer applies his material, or it may be applied upon felt.

The object of using litharge is to make the composition dry and harder, after being applied, and the amount of the same may be varied according as it is desired to have the same dry and harden more or less rapidly.

The object of the plumbago is to render the composition fire-proof, while the purpose of the clay is to give a body to the composition, it being fire-proofing at the same time, or blue-rock may be used for the same purpose. The said pulverized clay or blue-rock may be used alone without the plumbago, if desired, although I consider its use in the composition as very desirable. The plumbago alone may be used without the pulverized clay, sufficient being used to give the required consistency to the mixture. The only objection to the use of plumbago alone being the great expense of the same, the essential point being to employ some suitable fire-proofing material to thicken or give consistency to the preparation, and hence either plumbago and pulverized clay together, or either of said ingredients alone, or any other suitable substance, may be used for the purpose, and hence it follows that the described portion of the plumbago is not in any manner essential, as, if more be used, less of the pulverized clay will be required, and if less plumbago be used, more of the said clay must be taken.

The object of the sulphur is to vulcanize the mass, and hence the amount of the said ingredient may be proportionally increased or diminished, according to the degree of vulcanization desired.

The composition herein described is elastic to a high degree, even without the use or employment of the India rubber, as mentioned. I do not regard the use of India rubber very important, and do not desire to include it as an essential feature in my invention, and one to be used or not, as may be preferred, yet one which I prefer to use on account of the additional toughness and elasticity which it gives to the material, and which may be used in any desired quantity, while I regard the proportion as specified, as substantially the suitable amount or proportion to use.

Having described my invention, I will now proceed to specify what I claim, and desire to secure by Letters Patent.

1. I claim a composition for roofing and other analogous uses, composed of coal-tar, sulphur, plumbago, clay, and litharge, substantially as herein specified.

2. I claim, in combination with the above, the employment of the ingredient, India rubber, substantially in the manner and for the purpose set forth.

HENRY R. SCHANCK.

Witnesses:
 THOS. O. SHAW,
 W. C. MARRS.